United States Patent
Sumcad et al.

(10) Patent No.: US 7,400,954 B2
(45) Date of Patent: Jul. 15, 2008

(54) SYSTEM AND METHOD FOR DATA CORRELATION WITHIN A TELEMATICS COMMUNICATION SYSTEM

(75) Inventors: Anthony J. Sumcad, Southfield, MI (US); Brad T. Reeser, Lake Orion, MI (US); Hitan S. Kamdar, Utica, MI (US)

(73) Assignee: General Motors Corporation, Detroit, MI (US)

( * ) Notice: Subject to any disclaimer, the term of this patent is extended or adjusted under 35 U.S.C. 154(b) by 424 days.

(21) Appl. No.: 10/949,850

(22) Filed: Sep. 24, 2004

(65) Prior Publication Data

US 2006/0069473 A1   Mar. 30, 2006

(51) Int. Cl.
*G01M 17/00* (2006.01)
*G06F 7/00* (2006.01)

(52) U.S. Cl. .......................................... 701/29; 701/33
(58) Field of Classification Search ................ None
See application file for complete search history.

(56) References Cited

U.S. PATENT DOCUMENTS

| | | | |
|---|---|---|---|
| 5,442,553 A * | 8/1995 | Parrillo | 455/420 |
| 6,580,916 B1 * | 6/2003 | Weisshaar et al. | 455/456.1 |
| 6,662,091 B2 * | 12/2003 | Wilson et al. | 701/33 |
| 6,745,151 B2 | 6/2004 | Marko et al. | |
| 6,957,133 B1 * | 10/2005 | Hunt et al. | 701/29 |
| 7,085,680 B2 * | 8/2006 | Huang | 702/183 |
| 2002/0007237 A1 * | 1/2002 | Phung et al. | 701/33 |
| 2003/0009270 A1 * | 1/2003 | Breed | 701/29 |
| 2003/0114965 A1 * | 6/2003 | Fiechter et al. | 701/29 |
| 2004/0267410 A1 * | 12/2004 | Duri et al. | 701/1 |
| 2005/0068174 A1 * | 3/2005 | Oesterling et al. | 340/539.24 |

OTHER PUBLICATIONS

Kelly Carroll, Data to ride shotgun: InfoMove helps connect cars to Internet, Telephony Dec. 13, 1999, Copyright 1999 by PRIMEDIA Business Magazines & Media Inc., "All Rights Reserved", Telephony, Spectrum, ISSN: 0040-2656, 1091 words.

(Continued)

*Primary Examiner*—Michael J. Zanelli (57) ABSTRACT

The present invention provides a method of operating a telematics enabled mobile vehicle communication system. The method includes receiving vehicle diagnostic information at a relational database and analyzing the received vehicle diagnostic information. The method further includes identifying data correlations of interest identifying common elements associated with one or more specific situations based on the analyzed vehicle diagnostic information and identifying at least one client related to the data correlations. The method may further include distributing the vehicle diagnostic information associated with the identified data correlations and the identified clients. The step of identifying data correlations of interest based on the analyzed vehicle diagnostic information may include receiving diagnostic criteria, applying the diagnostic criteria to the analyzed vehicle diagnostic information, and determining whether one or more diagnostic information groups of the analyzed vehicle diagnostic information correlate to the diagnostic criteria.

13 Claims, 3 Drawing Sheets

OTHER PUBLICATIONS

Seattle, InfoMove Delivers New Generation of Wireless Internet Services for the Car, Business Wire, Oct. 18, 1999, Copyright 1999 Business Wire, Inc. Business Wire, Business Editors/Technology Writers, 994 words.

Bob Low, Motoring in the new millennium on the Net, Daily Record, May 1, 1998, Copyright 1998 Scottish Daily Record & Sunday Mail Ltd., Daily Record May 1, 1998, Friday, p. 31 Road, 734 words.

Tarre Beach, New Products: Sidebar, Wireless Review Apr. 1, 2000, Copyright 2000 by PRIMEDIA Business Magazines & Media Inc., "All rights Reserved" Wireless Review, Apr. 1, 2000, New Products; ISSN: 1099-9248, 351 words.

Flint, Mich., Jan. 3, BUIC XP2000—A Concept Cat For The 21$^{st}$ Century, PR Newswire, Jan. 3, 1995, Copyright 1995 PR Newswire Association, Inc. PR Newswire, Jan. 3, 1995, Tuesday, Financial News, (With Photo) To Business and Auto Editors, 2149 words.

* cited by examiner

SYSTEM AND METHOD FOR DATA CORRELATION WITHIN A TELEMATICS COMMUNICATION SYSTEM

FIELD OF THE INVENTION

This invention relates generally to wireless communications. More specifically, the invention relates to a method and system for operating a telematics enabled mobile vehicle communication system.

BACKGROUND OF THE INVENTION

The opportunity to utilize wireless features is ever increasing as cellular transceivers are being transformed into entertainment as well as communication platforms. One such cellular transceiver is a wireless feature included within wireless vehicle communication and networking services for a mobile vehicle. Another such cellular transceiver includes capabilities to receive satellite broadcasts such as, for example, Global Positioning System (GPS) signals and satellite radio signals.

Typically, wireless systems within mobile vehicles (e.g., telematics units) provide voice communication. These wireless systems have also been utilized to update systems within telematics units such as, for example, radio station presets. Additionally, these wireless systems have been utilized to send data to service providers. For example, sensor data may be sent to assist the mobile vehicle manufacturer in maintaining the mobile vehicle.

Reception of data, such as sensor data, by the service provider from the telematics units can result in an information overload. Consequently, the receipt of so much data may prevent efficient use of the information carried within the data.

The present invention advances the state of the art for operating a telematics enabled mobile vehicle communication system.

SUMMARY OF THE INVENTION

One aspect of the invention includes a method of operating a telematics enabled mobile vehicle communication system. The method includes receiving vehicle diagnostic information to a relational database and analyzing the received vehicle diagnostic information. The method further includes identifying data correlations of interest identifying common elements associated with one or more specific situations based on the analyzed vehicle diagnostic information. The method additionally includes identifying at least one client related to the data correlations.

In accordance with another aspect of the invention, a computer readable medium storing a computer program for operating a telematics enabled mobile vehicle communication system includes: computer readable code for providing received vehicle diagnostic information to a relational database; computer readable code for analyzing the received vehicle diagnostic information; computer readable code for identifying data correlations of interest based on the analyzed vehicle diagnostic information; and computer readable code for identifying at least one client related to the data correlations.

In accordance with yet another aspect of the invention, a telematics enabled mobile vehicle communication system is provided. The system includes means for receiving vehicle diagnostic information to a relational database. The system additionally includes means for analyzing the received vehicle diagnostic information. Means for identifying data correlations of interest based on the analyzed vehicle diagnostic information is provided. Means for identifying at least one client related to the data correlations is also provided.

The aforementioned and other features and advantages of the invention will become further apparent from the following detailed description of the presently preferred embodiments, read in conjunction with the accompanying drawings. The drawings are not drawn to scale. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
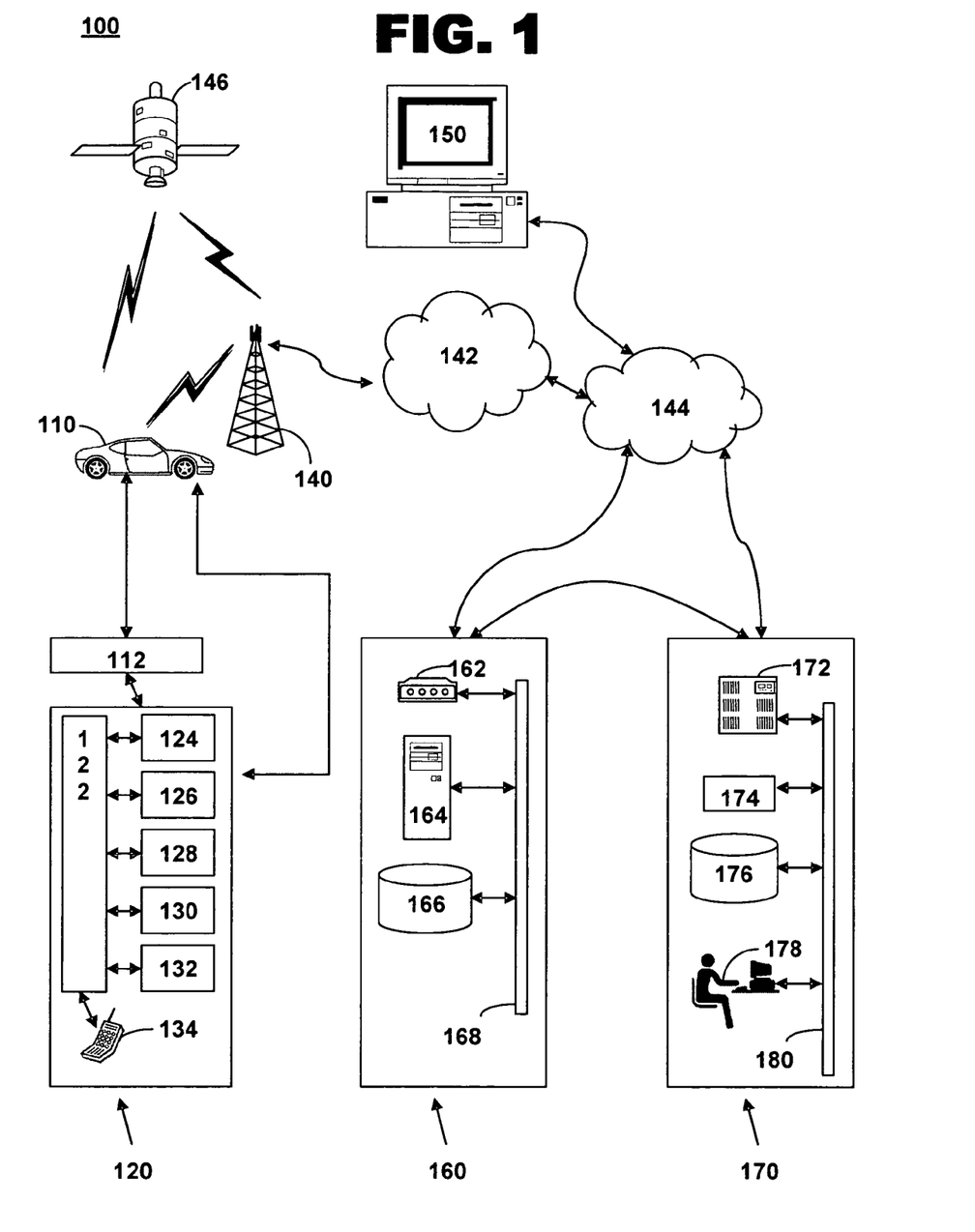
FIG. 1 illustrates an operating environment for implementing wireless communication within a mobile vehicle communication system.

FIG. 1 illustrates one embodiment of an operating environment for implementing wireless communication within a mobile vehicle communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more satellite broadcast systems 146, one or more client, personal, or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion.

In one embodiment, processor 122 is implemented as a microcontroller, controller, digital signal processor (DSP), host processor, or vehicle communications processor. In an example, processor 122 is implemented as an application specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). GPS unit 126 additionally provides time information based on the received GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band (2.3 GHZ) that has been allocated by the U.S. Federal Communications Commission (FCC) for nationwide broadcasting of satellite-based Digital Audio Radio Service (DARS).

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In yet another embodiment, broadcast services include various generically formatted data packets regularly transmitted by satellite broadcast system 146. In an example, generically formatted data packets such as, for example, pseudo-random code received by telematics unit 120, are processed by processor 122. In this example, pseudo-random code received by telematics unit 120 is processed into GPS coordinates by processor 122, such as by trilateration, and provided to telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Personal or client computer 150 sends user preferences to web-hosting portal 160 through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110.

In operation, a client utilizes computer 150 to initiate setting or re-setting of user preferences for MVCU 110. In one embodiment, a client utilizes computer 150 to provide radio station presets as user preferences for MVCU 110. In an example, user-preference data from client-side software is transmitted to server-side software of web-hosting portal 160. In this example, user-preference data is stored at web-hosting portal 160. In another example, user-preference data from client-side software is transmitted to server-side software of web-hosting portal 160. In this example, user-preference data is stored at web-hosting portal 160 and later transmitted to MVCU 110 via wireless carrier system 140 or satellite broadcast system 146. In another example, user-preference data is transmitted directly to MVCU 110 via wireless carrier system 140 or satellite broadcast system 146.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless vehicle communication, networking, maintenance, and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services including initiating data over voice channel wireless communication, enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data such as, for example roadside assistance, vehicle updates, and the like to telematics unit 120 in MVCU 110 through wireless carrier system 140, communication network 142, land network 144, satellite broadcast system 146, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through satellite broadcast system 146, communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140 and satellite broadcast system 146. In this embodiment, an inbound communication is routed to call center 170 from telematics unit 120 via wireless carrier system 140, communication network 142, and land network 144.

Figure 2:
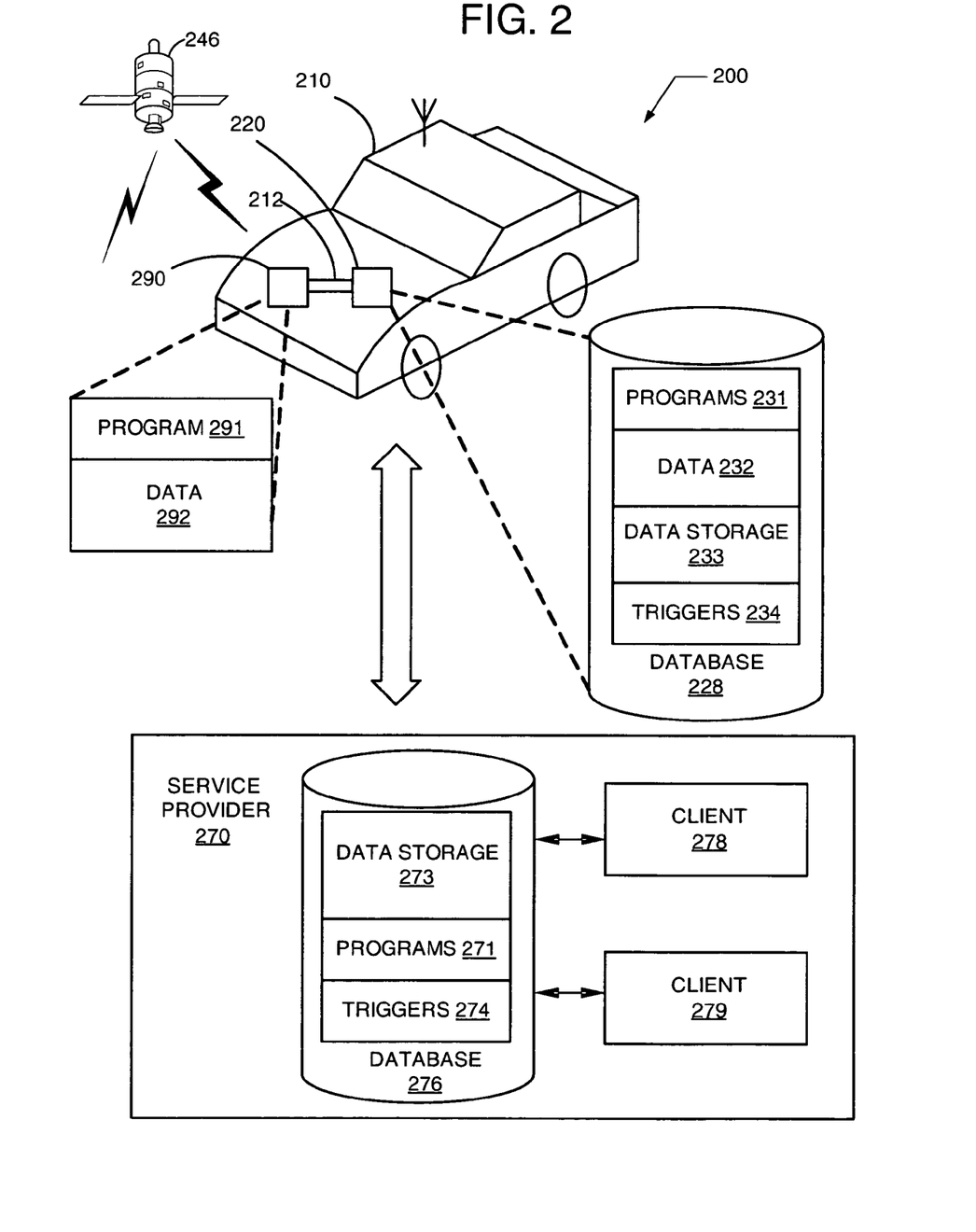
FIG. 2 is a block diagram of a telematics-based system in accordance with an embodiment of the present invention.

FIG. 2 is a block diagram of a telematics-based system in accordance with an embodiment of the present invention. FIG. 2 shows a telematics-based system 200 for operating a vehicle telematics device as a data collection and transmission device.

In FIG. 2, the telematics-based system 200 includes a mobile vehicle 210, satellite broadcast system 246, and a service provider 270. Mobile vehicle 210 includes a telematics unit 220 coupled to one or more vehicle system modules 290 via a vehicle communication network 212. Telematics unit 220 further includes a database 228 that contains programs 231, program data 232, data storage 233, and triggers 234. One or more vehicle system modules (VSM) 290 are included within mobile vehicle 210 and each VSM 290 further includes a program 291 and data 292. In another embodiment, a VSM 290 within mobile vehicle 210 is located within telematics unit 220. In FIG. 2, the elements are presented for illustrative purposes and are not intended to be limiting. Telematics-based system 200 may include additional components not relevant to the present discussion.

Telematics unit 220 is any telematics device enabled for operation with a telematics service provider such as, for example, telematics unit 120 as described with reference to FIG. 1. Telematics unit 220 in vehicle 210 is in communication with a service provider (e.g., a "service center"). Telematics unit 220 includes volatile and non-volatile memory components for storing data and programs. In one embodiment, memory components in telematics unit 220 contain database 228.

Database 228 includes one or more programs 231 for operating telematics unit 220. For example, database 228 includes a program for operating a vehicle telematics device to receive data collected from sensors, for operating a vehicle telematics device as a satellite signal receiver, and the like. In operation, program 231 executes loaded programs containing onboard instructions and/or received instructions and data in the form of onboard programming, a data stream from a service provider, commands from a user interface (not shown), and the like at data storage 233. In one embodiment, data storage 233 also contains vehicle identification information, such as, for example vehicle account information and the like. Program 231 executes the instructions, for example, by parsing the data stream/program instructions for additional instructions as well as data and triggers. In one embodiment, program 231 parses the data stream/program instructions and stores triggers at triggers 234. In this embodiment, program 231 transfers data to and receives data from VSM 290 for execution. In an example, program 231 parses the data stream/program instructions and determines current time and location information, such as, time and location information of a sensor event, from a satellite broadcast system, such as, GPS information. Examples of sensor events include braking events, mobile vehicle shaking events, and the like.

In another example, program 231 receives vehicle diagnostic information from VSM 290 and transmits the vehicle diagnostic information to service provider 270. In yet another example, program 231 receives vehicle diagnostic information from VSM 290 as well as GPS information and produces diagnostic information that is transmitted to service provider 270.

In another embodiment, database 228 includes a relational database that is populated with received vehicle diagnostic information. In this embodiment, the relational database analyzes the received vehicle diagnostic information and identifies data correlations of interest. Examples of data correlations of interest include common dealership, common transportation contractors, common manufacturer facility, and the like.

In operation, vehicle diagnostic information is analyzed to identify data correlations of interest indicating patterns identifying common elements associated with one or more specific situations. In this embodiment, the telematics unit receives diagnostic criteria for identifying the data correlations of interest from various sources. Examples of sources providing diagnostic criteria for identifying the data correlations include pre-selected diagnostic criteria located within the database and provided by the manufacturer, pre-selected diagnostic criteria communicated from the service provider to the telematics unit and provided by the manufacturer, modified diagnostic criteria communicated from the service provider and provided by a client, such as, within the service provider, and the like.

In an example, analyzed vehicle diagnostic information indicates that certain vehicles at a dealership are experiencing steering issues and that the vehicles in question arrived via the same transport operator. This data correlation of interest is then communicated to relevant clients, such as, one or more clients 278, 279 within service provider 270.

VSM 290 is any vehicle system control module having software and hardware components for operating, controlling, or monitoring one or more vehicle systems and sensors. In one embodiment, VSM 290 provides location information and is a global positioning system (GPS) module such as, for example, GPS unit 126 of FIG. 1. In another embodiment, VSM 290 is a control module for receiving sensor information and processing the received sensor information.

Vehicle system module 290 contains one or more processors, one or more memory devices, and one or more connection ports. In one embodiment, VSM 290 includes a software switch for scanning received satellite broadcast information, such as, for example GPS information to identify that data has been received. In another embodiment, VSM 290 includes a software switch for scanning received sensor information, such as vehicle diagnostic information to identify that data has been received. An example of vehicle diagnostic information includes vehicle diagnostic information having one or more diagnostic trouble codes.

VSM 290 is coupled to vehicle communication network 212 and, therefore, to any other device that is also coupled to vehicle communication network 212. In an example, vehicle communication network 212 is a vehicle communication network 112 as described in FIG. 1, above.

In one embodiment, VSM 290 is directly coupled to telematics unit 220 in primary mobile vehicle 210. In one embodiment, vehicle communication network 212 directly couples telematics unit 220 to vehicle system module 290. In another embodiment, VSM 290 is indirectly coupled to telematics unit 220.

In operation, when VSM 290 is implemented as a GPS receiver unit, program 291 operating within VSM 290 generates time and location information based on received GPS information and stores the generated time information at data 292. VSM 290 provides the time and location information to telematics unit 220 when required. When VSM 290 is implemented as a sensor receiver unit, program 291 operating within VSM 290 generates diagnostic information based on received sensor information and stores the generated diagnostic information at data 292. In an example, the vehicle diagnostic information includes one or more diagnostic trouble codes. VSM 290 provides the diagnostic information to telematics unit 220 when required. In one embodiment, a plurality of vehicle system modules (VSMs) is implemented.

In this embodiment, a VSM is implemented as a GPS receiver unit and another VSM is implemented as a sensor receiver unit. Both VSMs function as described above and provide associated information to the telematics unit when required.

Satellite broadcast system 246 is any satellite broadcast system enabled for operation as a global positioning system (GPS) provider, such as, for example satellite broadcast system 146 as described with reference to FIG. 1. In one embodiment, satellite broadcast system 246 provides time based GPS information to a vehicle system module implemented as a GPS receiver.

Service provider 270 is any service center providing telematics services such as service center 170 described with reference to FIG. 1. In one embodiment, service provider 270 is enabled to concatenate and otherwise manage database 276 and includes hardware and software for managing database 276 as one or more data tables. In another embodiment, service center 270 is configured to access a database that is in another location but coupled to service center 270 such as, for example, database 166 in web server 160 as described in FIG. 1. Service provider 270 further includes clients 278, 279 in communication with database 276. Example of clients 278, 279 include work groups, companies, individuals, dealerships, manufacturers, maintenance facility, research facilities, material handlers, data mining facilities, marketing facilities, call centers, telematics call centers, and the like.

Database 276 contains one or more data tables stored at data storage 273 and trigger event data stored at triggers 274. In one embodiment, database 276 includes one or more programs 271 for managing one or more data tables by, for example, updating the one or more data tables and then providing the updated data tables to a telematics -based system 200, such as, MVCS 100 of FIG. 1 above. In an example, trigger event data specifying conditions for providing updated data tables is located in triggers 274.

In one embodiment, database 276 is implemented as a relational database that is populated with vehicle diagnostic information received from telematics unit 220 of mobile vehicle 210. In this embodiment, the relational database analyzes the received vehicle diagnostic information and identifies data correlations of interest. In operation, vehicle diagnostic information is analyzed to identify data correlations of interest indicating patterns identifying common elements associated with one or more specific situations. In this embodiment, the database receives diagnostic criteria for identifying the data correlations of interest from various sources, such as, pre-selected diagnostic criteria located within the database and provided by the manufacturer and modified diagnostic criteria located within the database and provided by a client, such as, within the service provider.

In an example, analyzed vehicle diagnostic information indicates that certain vehicles at a dealership are experiencing steering issues and that the vehicles in question arrived via the same transport operator. This data correlation of interest is then communicated to relevant clients, such as, one or more clients 278, 279 within service provider 270.

In illustrative operation, program 231 of telematics unit 220 receives vehicle diagnostic information as well as GPS information from one or more VSMs 290 and produces diagnostic information that is transmitted to service provider 270. Database 276 analyzes the received vehicle diagnostic information and identifies data correlations of interest. Database 276 determines at least one client related to the data correlations. In one embodiment, database 276 distributes the vehicle diagnostic information associated with the identified data correlations and the identified clients, such as, to requesting clients.

In another embodiment, program 271 of service provider 270 receives vehicle diagnostic information as well as GPS information from one or more VSMs 290 located in one or more mobile vehicles 210, and produces diagnostic information stored in data storage 273. Program 271 analyzes the received vehicle diagnostic information and identifies data correlations of interest. Program 271 determines at least one client related to the data correlations. In one embodiment, database 276 distributes the vehicle diagnostic information associated with the identified data correlations and the identified clients, such as, to requesting clients.

Figure 3:
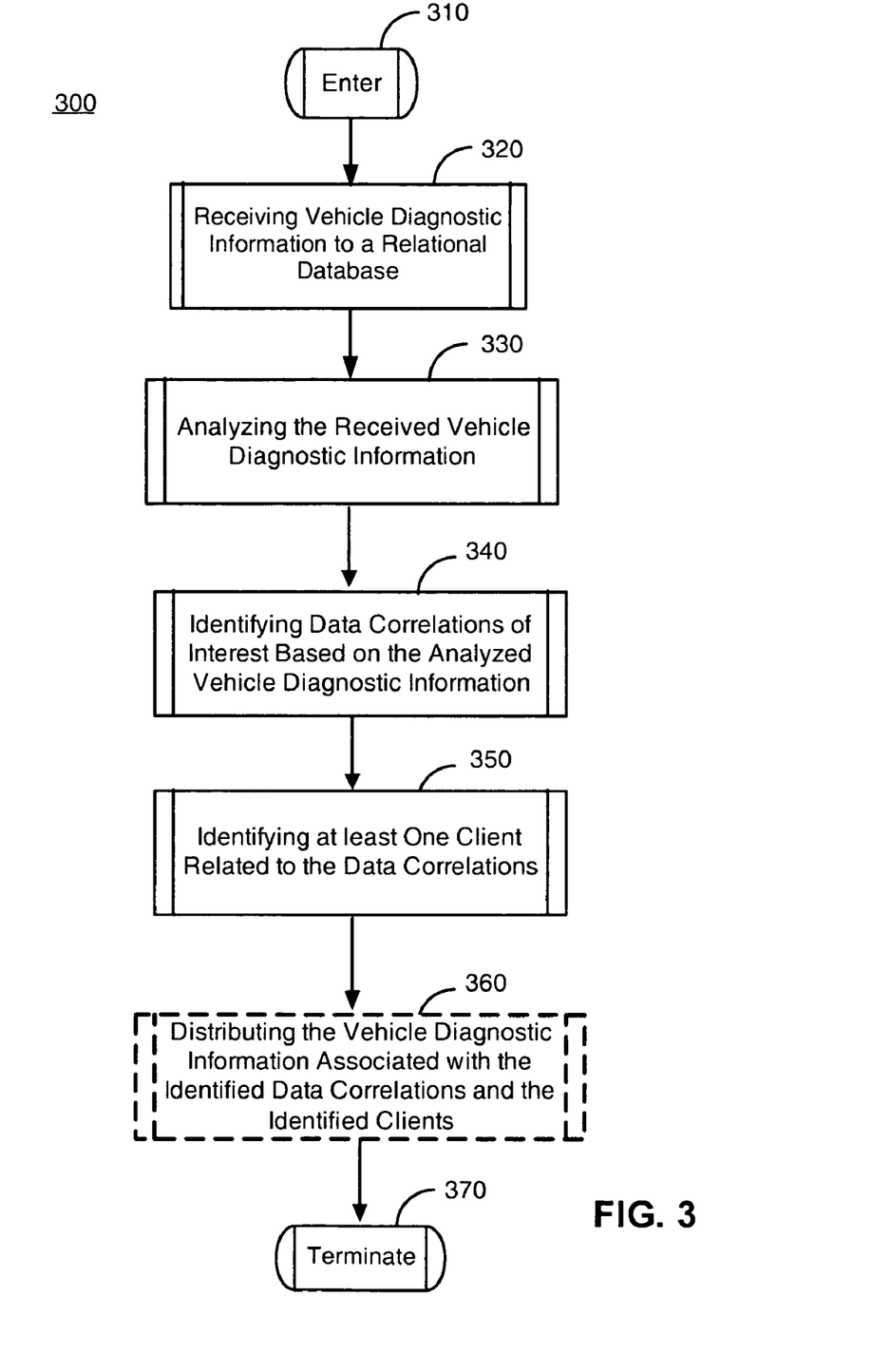
FIG. 3 is a flow diagram of one embodiment of a method of operating a vehicle telematics device, in accordance with the present invention.

FIG. 3 is a flow diagram of one embodiment of a method of operating a telematics enabled mobile vehicle communication system. In FIG. 3, method 300 may utilize one or more systems and concepts detailed in FIGS. 1 and 2, above. The present invention can also take the form of a computer usable medium including a computer program for operating a telematics enabled mobile vehicle communication system. The program stored in the computer usable medium includes computer program code for executing the method steps described in FIG. 3. In FIG. 3, method 300 begins at step 310.

At step 320, vehicle diagnostic information, such as one or more diagnostic trouble codes, is received by a relational database. In one embodiment, vehicle diagnostic information is at a relational database from a telematics unit within a service provider. In an example and referring to FIG. 2 above, vehicle diagnostic information is received at relational database 276 from telematics unit 220. In another embodiment, vehicle diagnostic information is communicated from one or more vehicle service modules (VSMs) to a relational database within a telematics unit. In an example and referring to FIG. 2 above, vehicle diagnostic information is communicated from one or more vehicle service modules (VSMs) 290 to relational database 228 within telematics unit 220.

In one embodiment, method 300 further includes the steps of communicating vehicle diagnostic information from a telematics device to a service provider and producing a relational database at the service provider based on the communicated vehicle diagnostic information. In another embodiment, method 300 further includes the steps of communicating vehicle diagnostic information to a telematics device and producing a relational database at the telematics device based on the communicated vehicle diagnostic information.

At step 330, the received vehicle diagnostic information is analyzed. In one embodiment, the received vehicle diagnostic information is analyzed by retrieving the diagnostic information from the relational database, parsing the retrieved diagnostic information, and producing diagnostic information groups based on the parsed diagnostic information. In an example and referring to FIG. 2 above, program 271 retrieves the diagnostic information from data storage 273, parses the retrieved diagnostic information, and produces diagnostic information groups based on the parsed diagnostic information within service provider 270. In this example, diagnostic information groups are groupings of related diagnostic information, such as, for example all diagnostic trouble codes from a specific system of a specific mobile vehicle. In an example and referring to FIG. 2 above, program 231 retrieves the diagnostic information from data storage 233, parses the retrieved diagnostic information, and produces diagnostic information groups based on the parsed diagnostic information within telematics unit 220.

At step 340, data correlations of interest are identified based on the analyzed vehicle diagnostic information. The data correlations of interest identify common elements associated with one or more specific situations. In one embodiment, identifying data correlations of interest based on the analyzed vehicle diagnostic information includes receiving diagnostic criteria, applying the diagnostic criteria to the analyzed vehicle diagnostic information, and determining whether one or more diagnostic information groups of the analyzed vehicle diagnostic information correlate to the diagnostic criteria.

In an example and referring to FIG. 2 above, program 271 receives diagnostic criteria from one or more clients, such as, clients (278 and 279). In this example, program 271 applies the diagnostic criteria to the analyzed vehicle diagnostic information and determines whether one or more diagnostic information groups of the analyzed vehicle diagnostic information correlate to the diagnostic criteria. Other sources of diagnostic criteria include pre-determined diagnostic criteria service package within a service provider, modified diagnostic criteria service package within a service provider, and the like. In another example and referring to FIG. 2 above, program 231 receives diagnostic criteria from one or more clients, such as, clients (278 and 279) via service provider 270 and telematics unit 220. In this example, program 231 applies the diagnostic criteria to the analyzed vehicle diagnostic information and determines whether one or more diagnostic information groups of the analyzed vehicle diagnostic information correlate to the diagnostic criteria. Other sources of diagnostic criteria include pre-determined diagnostic criteria service package within a telematics unit, customized diagnostic criteria service package within a telematics unit, and the like.

At step 350, at least one client related to the data correlations is identified. In one embodiment, the program identifies one or more clients related to the data correlations. In an example and referring to FIG. 2 above, program 271 identifies one or more clients (278 and 279) related to the data correlations. In another example and referring to FIG. 2 above, program 231 identifies one or more clients (278 and 279) related to the data correlations.

At optional step 360, the vehicle diagnostic information associated with the identified data correlations and the identified clients is distributed. In one embodiment, the program distributes the vehicle diagnostic information associated with the identified data correlations and the identified clients. In an example and referring to FIG. 2 above, program 271 distributes the vehicle diagnostic information associated with the identified data correlations and the identified clients. In another example and referring to FIG. 2 above, program 231 distributes the vehicle diagnostic information associated with the identified data correlations and the identified clients.

At step 370, the method is terminated.

The above-described methods and implementation for operating a telematics enabled mobile vehicle communication system are example methods and implementations. These methods and implementations illustrate one possible approach for operating a telematics enabled mobile vehicle communication system. The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

What is claimed is:

1. A method of correlating vehicle data, comprising the steps of:
   receiving vehicle diagnostic information from multiple vehicles, the vehicle diagnostic information being indicative of a vehicle problem;
   determining data correlations of interest by analyzing the vehicle diagnostic information from the multiple vehicles, the data correlations of interest being indicative of a common vehicle problem among at least some of the multiple vehicles; and
   identifying at least one common dealership or transportation contractor related to the vehicles exhibiting the common vehicle problem, wherein the identifying step is carried out using at least one database that associates vehicles with the common dealership or transportation contractor.

2. The method of claim 1, further comprising the step of notifying the common dealership or transportation contractor of the common vehicle problem.

3. The method of claim 2, wherein the common dealership or transportation contractor is identified as a potential source of the common vehicle problem.

4. The method of claim 1, wherein the determining step further comprising determining the data correlations of interest using a database that contains one or more of the following: vehicle manufacturing information, vehicle dealership information, vehicle maintenance information, or vehicle warranty information.

5. The method of claim 1, wherein the receiving step further comprises the steps of:
   collecting the vehicle diagnostic information at a vehicle telematics unit; and
   sending the vehicle diagnostic information from the vehicle telematics unit to a call center over a wireless communication network.

6. The method of claim 1, further comprising the steps of:
   parsing the vehicle diagnostic information; and
   producing vehicle diagnostic groups based on the parsed diagnostic information.

7. The method of claim 1, wherein the vehicle diagnostic information comprises vehicle diagnostic trouble codes.

8. A method of correlating vehicle data, comprising the steps of:
   providing a database containing information on dealerships and transportation contractors for each of a plurality of vehicles,
   collecting vehicle diagnostic information at a vehicle telematics unit of each of the plurality of different vehicles;
   transmitting the collected vehicle diagnostic information over a wireless communication network from the vehicle telematics units of the vehicles to a call center;
   correlating the transmitted vehicle diagnostic information and determining from the correlation that at least some of the vehicles have a common vehicle problem; and
   identifying one or more service providers associated with the distribution or servicing of the vehicles having the common vehicle problem, wherein the identifying step is carried out using the database of information on dealerships and transportation contractors in conjunction with information for the vehicles having the common vehicle problem.

9. The method of claim 8, further comprising the step of notifying the one or more service providers of the common vehicle problem.

10. The method of claim 9, wherein the one or more service providers are identified as a potential source of the common vehicle problem.

11. The method of claim 8, wherein the one or more service providers comprise one or more of the dealerships or transportation contractors.

12. The method of claim 8, further comprising the steps of:

parsing the vehicle diagnostic information; and producing vehicle diagnostic groups based on the parsed diagnostic information, each vehicle diagnostic group containing vehicle diagnostic information related to a particular vehicle system.

13. The method of claim 8, wherein the vehicle diagnostic information contains one or more vehicle diagnostic trouble codes.

* * * * *